United States Patent [19]

Sangree

[11] 4,388,570
[45] Jun. 14, 1983

[54] DIGITALLY CONTROLLED PULSE WIDTH MODULATED MOTOR SPEED CONTROL FOR SERVO POSITIONING SYSTEMS

[75] Inventor: Neal V. Sangree, Alliance, Ohio

[73] Assignee: The Babcock & Wilcox Company, New Orleans, La.

[21] Appl. No.: 244,493

[22] Filed: Mar. 16, 1981

[51] Int. Cl.³ .............................................. H02P 5/16
[52] U.S. Cl. .................................... 318/255; 318/601
[58] Field of Search ............... 318/255, 341, 257, 549, 318/601, 603, 604

[56] References Cited

U.S. PATENT DOCUMENTS 4,201,936 5/1980 Roumanis .......................... 318/341
4,263,557 4/1981 Jorvinen .............................. 318/341

Primary Examiner—J. V. Truhe
Assistant Examiner—A. Evans
Attorney, Agent, or Firm—James A. Hudak; Vytas R. Matas; Robert J. Edwards

[57] ABSTRACT

A digitally controlled pulse width modulated control system for a servo device is disclosed wherein the control transistors (46, 48, 50, 52) can be operated directly from the incoming voltage source. The system converts the input or feedback signal into digital form that is applied to a downward counter arrangement (16, 18) which, after a pre-set period of time, allows logic circuitry (20) to selectively apply conduction pulses to the transistors (46, 48, 50, 52). Such selective conduction allows the transistors (46, 48, 50, 52) to regulate the direction of rotation of a motor (58) and the "width" or portion of the incoming waveform applied thereto via the transistors (46, 48, 50, 52).

8 Claims, 2 Drawing Figures

DIGITALLY CONTROLLED PULSE WIDTH MODULATED MOTOR SPEED CONTROL FOR SERVO POSITIONING SYSTEMS

TECHNICAL FIELD

The present invention relates generally to motor speed control techniques, and more particlarly to a motor speed control technique that uses pulse width modulation in conjunction with transistors which are powered directly from the incoming power source.

BACKGROUND ART

Pulse width modulation has been used as a motor speed control technique for a number of years. Typically, such an approach requires a transformer and a power supply to convert the A.C. line voltage into a D.C. voltage which is selectively applied to transistors so as to control which transistors conduct and the length of time that they conduct. The conduction of one pair of transistors causes the motor to rotate in one direction whereas the conduction of another pair of transistors causes motor rotation in the opposite direction. In both cases, the length of time that the transistors are conducting determines the speed of the motor. While this technique provides good speed regulation and control, it requires a transformer and power supply which can be quite bulky.

A variation of the foregoing utilizes SCR's in a back-to-back relationship. The motor rotates in one direction when the first SCR is triggered during the positive half cycle of the A.C. line voltage, and rotates in the opposite direction if the second SCR is triggered during the negative half cycle of the A.C. line voltage. In either case the speed of the motor depends on the "firing angle" of the SCR. This method eliminates the need for a transformer and power supply but is susceptible to drift and instabilities particularly around the zero speed point, which is of primary concern in a servo positioning system.

Because of the foregoing, it has become desirable to develop a motor speed control system which can be powered directly from the incoming power line without the need for a transformer and power supply, which is not susceptible to drift and instabilities, and which can be adapted for use with series wound, or shunt wound A.C. motors or D.C. motors.

SUMMARY OF THE INVENTION

The present invention solves the aforementioned problems associated with the prior art as well as other problems by utilizing digital techniques to control the firing of transistors which, in turn, control and regulate the speed and direction of rotation of a drive motor. This is accomplished by converting an analog "command" or feedback signal into digital form. This digital signal is transmitted to a downward counter arrangement which, after a pre-set period of time, causes logic circuitry to selectively apply a firing pulse to the transistors which control the rotation of the motor. The length of the pulse determines the speed of the motor, whereas the direction of motor rotation is determined by which transistors are selectively actuated. The operation of the analog to digital converter is regulated by a detector so that the entire system is synchronized with the incoming voltage waveform. In this manner the transistors which control the direction and speed of the motor can be powered directly from the incoming voltage source.

In view of the foregoing, it will be seen that one aspect of the present invention is to provide a motor speed control system that utilizes pulse width modulation techniques and which can be powered directly from the incoming voltage source.

Another aspect of the present invention is to provide a motor speed control system that utilizes digital logic circuitry resulting in a system which is relatively stable and not susceptible to drift.

Still another aspect of the present invention is to provide a motor speed control system that can be utilized for series wound or shunt wound A.C. motors or for D.C. motors.

These and other aspects of the present invention will become more clearly understood after a review of the following description of the preferred embodiment when considered with the following drawings.

DESCRIPTION OF THE PREFERRED EMBODIMENT

Figure 1:
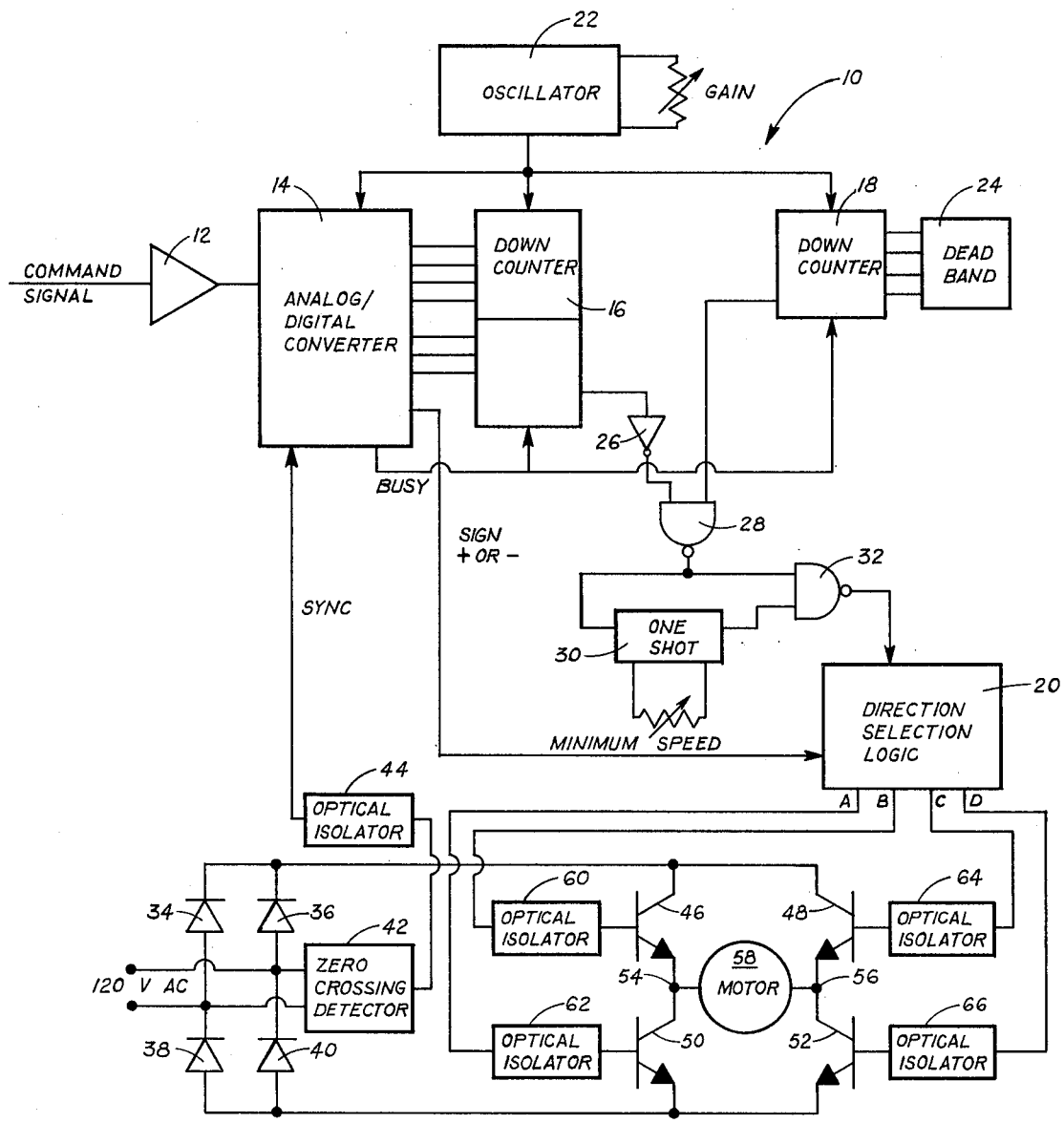
FIG. 1 is an electrical schematic of the invention of the disclosure.

Referring now to the drawings where the illustrations are for the purpose of describing the preferred embodiments of the present invention and are not intended to limit the invention hereto, FIG. 1 is a schematic diagram of the circuit 10 used by the apparatus of the present invention. In FIG. 1, an input or command signal, such as a feedback signal, is applied to an input amplifier 12 whose output is connected to the input of an analog to digital converter 14. The analog to digital converter 14 has multiple outputs so as to be connectable to counters 16, 18 and to a direction selection logic circuit 20. A variable frequency oscillator 22 is provided and is connected to the analog to digital converter 14 and to the counters 16, 18 so as to regulate same. Counter 18 is further regulated by a "deadband" circuit 24 which is connected thereto. The output of the counter 16 is connected to the input to an inverting element 26 which inverts the signal applied thereto. This inverted signal, along with the output signal from the counter 18, are applied to the inputs to a NAND gate 28, whose output is, in turn, connected to a one-shot multivibrator 30 and to another NAND gate 32. The output of the NAND gate 32, along with one of the outputs from the analog to digital converter 14, are connected to the direction selection logic 20 which has four outputs A, B, C, D emanating therefrom, the connection of which will be hereinafter described.

A power source, such as a 120 volt A.C. supply, is connected to a bridge rectifier arrangement comprised of rectifiers 34, 36, 38, 40 and to a zero crossing detector 42. The output of the zero crossing detector 42 is connected, via an optical isolator 44, to an input on the analog to digital converter 14 and synchronizes the operation thereof. The outputs of the rectifiers 34 and 36 are connected to the collectors of transistors 46 and 48, whereas the inputs of the rectifiers 38 and 40 are connected to the emitters of transistors 50 and 52. The transistors 46, 48, 50 and 52 are arranged such that the emitter of transistor 46 is connected to the collector of transistor 50 at junction 54, while the emitter of transistor 48 is connected to the collector of transistor 52 at junction 56. The motor 58 being controlled and regulated is connected across junctions 52 and 56. The transistors 46, 48, 50 and 52 are also connected to the direction selection logic 20 through optical isolators 60, 62, 64 and 66, respectively such that the respective bases of these transistors are connected to inputs A, B, C, D respectively on the logic circuit 20.

The input amplifier 12 performs two functions: it acts as an input buffer to the analog to digital converter 14, and it amplifies the incoming "command" or feedback signal, hereinafter described, to some level so as to be readily convertible into a digital signal by the analog to digital converter 14. With a relatively high voltage "command" or feedback signal, the gain of the input amplifier 12 can be set at approximately one. Conversely, with a relatively low voltage "command" or feedback signal, the gain of the amplifier 12 can be set substantially higher.

The analog to digital converter 14 converts the "command" or feedback signal, as amplified by the input amplifier 12, into digital form. Upon actuation, the analog to digital converter 14 produces a seven-bit digital number plus a "sign" data bit. The "sign" data bit provides an indication as to which side of the null or desired position the motor 58 is operating on, i.e., whether the motor 58 must be advanced or retarded from its present operating position. In essence, the "sign" data bit determines which direction the motor is to turn.

The time required by the analog to digital converter 14 to convert the analog signal into digital form is determined by the variable frequency oscillator 22. This same oscillator can be used to regulate the operation of the counters 16, 18 or separate oscillators can be provided therefor.

As previously stated, the analog to digital converter 14 produces a seven-bit digital number and a "sign" data bit. The analog to digital converter 14 also produces a "busy" signal which is transmitted to both of the counters 16 and 18, and is used to indicate to these counters that the converter 14 is in the process of converting an analog signal into digital form and inhibits the operation of these counters while this is occurring. After this conversion has been completed, the "busy" signal is extinguished and both counters 16, 18 are permitted to resume operation.

The counter 16 is an eight-bit down counter which receives the seven-bit digital number from the analog to digital converter 14 and counts downwardly therefrom. In contrast, the counter 18 is a four-bit down counter and is selectively per-set by the deadband circuit 24 which is comprised of a plurality of switches that are separately actuatable. The use of this circuit 24 prevents the system from responding to variations of small value in the input signal. Response to such variations could cause system "hunting", an oscillation in the output motor, or system instability.

Both counters 16 and 18 start counting downwardly at the same time. The difference between the count set on the four-bit counter 18 and the count set on the eight-bit counter 16 determine the "length" of the pulse applied to the drive motor 58, as will be hereinafter described. The length of time required for these counters 16, 18 to count down to zero is determined by the frequency of the variable frequency oscillator 22. The lower the frequency, the longer the time difference between the count set on the counters 16 and 18 which results in a "longer" pulse being supplied to the motor 58 and a commensurate increase in motor speed. Conversely, the higher the frequency, the shorter the time difference between the count set on the counters 16 and 18 which results in a "shorter" pulse being applied to the motor 58 and a smaller increase in motor speed. Thus, by making the frequency of the oscillator 22 adjustable, the circuit "gain", i.e. increase in motor speed, can be readily changed. However, varying the frequency of the oscillator 22 also affects the conversion time of the analog to digital converter 14 and a separate oscillator may be required for same.

Operationally, a "command" or feedback signal is applied to the input amplifier 12. The "command" or feedback signal can be either a positive or negative voltage and is proportional to the difference in value between an actual operating parameter for the motor and the desired operating parameter at that time. For example, in a velocity control system, this "command" or feedback signal would be proportional to the actual motor speed and the desired or "set" motor speed.

Figure 2:
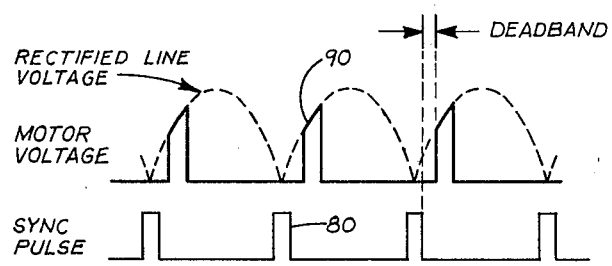
FIG. 2 is an illustration of the voltage waveform applied to the drive motor and the synchronizing waveform used by the system.

The zero crossing detector 42 senses when the incoming voltage sine wave crosses through zero, and, at that time, transmits a synchronizing pulse of approximately 200 microseconds in duration to the analog to digital converter 14 via the optical isolator 44. The waveform of this synchronizing pulse is shown in FIG. 2 as waveform 80. If a 60 cycle per second A.C. input is utilized, the zero crossing detector 42 transmits a synchronizing pulse 120 times per second to the analog to digital converter 14 and because of this, as will be hereinafter described, an actual operating parameter of the motor will be compared with the desired parameter 120 times per second. Upon receipt of this synchronizing pulse, the analog to digital converter 14 initiates a conversion cycle wherein it samples and converts the analog output voltage of the input amplifier 12 into a seven-bit digital number plus a "sign" bit. Upon completion of this conversion cycle, the seven-bit digital number is transmitted and entered into the counter 16 and the "sign" data bit is transmitted to the direction selection logic circuit 20. Simultaneously, a four bit number, representing the deadband, is entered into counter 18. While this is occurring, the counters 16 and 18 are inhibited from counting because of the "busy" signal which is being transmitted thereto from the analog to digital converter 14. After this conversion has been completed and the respective digital data has been entered into the counters 16 and 18, the "busy" signal is removed and the counters 16 and 18 start counting downwardly.

The operation of these counters 16 and 18 is such that while counting downwardly, both produce a digital (0) at their outputs and when they have completed their respective counts, a digital (1) is produced at their respective outputs. The digital output of the counter 18 is applied directly to the NAND gate 28, whereas the digital output of the counter 16 as inverted by the inverting element 26 before being applied to the gate 28. Thus, while the counters 16 and 18 are initially counting downwardly, the NAND gate 28 receives a digital (0) from the counter 18, and after being inverted, a digital (1) from counter 16 which causes the NAND gate 28 to produce a digital (1) at its output.

When counter 18, which is the four-bit data counter, has completed its downward count, its output changes to a digital (1). However, counter 16 which is the eight-bit data counter, is still counting downwardly and thus, because of inverting element 26, is still applying a digital (1) to the input of the NAND gate 28. The presence of the two digital (1) inputs to the NAND gate 28 causes it to produce a digital (0) at its output. This digital (0) remains as the output signal of the NAND gate 28 until the counter 16 has completed its downward count, at which time it changes back to a digital (1).

Normally, the output of the NAND gate 28 is a digital (1) and the output of the one-shot multivibrator 30 is also a digital (1) which, as inputs to the NAND gate 32, causes the gate 32 to have a digital (0) output. However, when the output of the NAND gate 28 becomes a digital (0), due to counter 18 having completed its downward count, the output of the NAND gate 32 becomes a digital (1) and continues in this output condition for the pulse duration from the one-shot multivibrator 30 or for the balance of the downward count by the counter 16, whichever is the longer in duration. In this manner, a minimum speed signal is always provided to the motor 58 in order to overcome the inertia of the motor and the associated drive system.

The digital (1) pulse from the NAND gate 32 is then used with the "sign" data bit from the analog to digital converter 14 as inputs to the direction selection logic circuit 20 which controls and regulates both the direction of rotation of the drive motor 58 and the time that the motor is energized. The direction selection logic 20 is comprised of "state of the art" components and is designed for the specific application. Inasmuch as the invention of this disclosure is directed to a control system rather than to any specific element thereof, no further description of this direction selection logic circuitry is needed other than to state it controls the selective conduction of the transistors 46, 48, 50 and 52.

The presence of a digital (1) pulse from the NAND gate 32 and a digital (1) "sign" data bit from the analog to digital converter 14 at the inputs to the direction selection logic 20 results in the logic circuitry causing either transistors 46 and 52 or transistors 48 and 50 to conduct simultaneously. Similarly, a digital (0) "sign" data bit from the analog to digital converter 14 results in the direction selection logic 20 causing the other pair of transistors to conduct, i.e., if transistors 46 and 52 conduct as a result of a digital (1) "sign" data bit, then transistors 40 and 50 will conduct as a result of a digital (0) "sign" data bit and vice versa. In this manner, the direction of rotation of the drive motor 58 can be controlled while its speed is regulated by the "width" of the pulse transmitted thereto via the conducting transistors.

The foregoing sequence occurs 120 times per second for a 60 cycle per second input power source. The actual voltage waveform applied to the drive motor 58 is shown as waveform 90 on FIG. 2. This waveform shows the rectified voltage curve, the adjustable "deadband", and the resulting voltage waveform applied to the motor. By comparing waveform 80 with waveform 90, it can be seen that the "deadband" is the time interval between the completion of the synchronizing pulse 80 and the commencement of the resulting voltage waveform 90 applied to the motor. This requires that the "command" or feedback signal, in order to affect the operation of the motor, must have a duration longer than that of the "deadband". In this manner, input signals of a small value such as noise, can be made to have no effect on the operation of the drive motor 58 by proper selection of the "deadband" setting.

It should be noted that manual controls or jog devices (not shown) can be included in the circuitry so as to by-pass or override the "command" or feedback signal and thus permit manual operation of the system.

Certain improvements and modifications will occur to those skilled in the art upon reading the foregoing. It should be understood that all such modifications and improvements have been deleted herein for the sake of conciseness and readability but are properly within the scope of the following claims.

I claim:

1. A pulse width modulated control system for positioning a servo device in response to an analog feedback signal indicative of the actual position of the servo device comprising:
    means for converting said analog feedback signal into a digital signal; having a first and second total number of predetermined bits;
    first counter means for receiving said digital signal of predetermined bits of said first total from said converting means and counting downward through said first total of predetermined bits and establishing a first control signal thereafter;
    second counter means for receiving said digital signal of predetermined bits of said second total number less than said first total and counting downward through said predetermined bits of said second total and establishing a second control signal thereafter;
    means for supplying power to said servo device;
    means for controlling the transmission of power from said power supplying means to said servo device; and
    circuit means responsive to said first and second control signals for selectively actuating said controlling means to regulate the operation of said servo device.

2. A pulse width modulated control system for a servo device comprising means for converting an analog input signal into a digital signal, means for receiving said digital signal and counting downward therefrom, means for retarding said receiving means from producing an output signal until a pre-determined count has been reached, said retarding means being a counting device having an adjustable output permitting the varying of said pre-determined count to regulate said output signal produced by said receiving means, means for supplying power to said servo device, means for controlling the transmission of power from said power supplying means to said servo device, said controlling means being electrically connected between said power supplying means and said servo device and being selectively actuatable for a variable period of time, means for synchronizing the operation of said converting means with said power suppying means, circuit means responsive to said output signal produced by said receiving means and selectively actuating said controlling means to regulate the speed and direction of rotation of said servo device, and means to insure that said output signal is of sufficient duration so that said controlling means is selectively actuated for a minimum period of time so as to overcome the inertia of said servo device.

3. A control system as defined in claim 1 wherein said second counter means includes a dead band adjustment to permit varying the count of said second counter means to thereby allow said circuit means to regulate said servo device.

4. A control system as defined in claim 3 further including a zero crossing detector circuit for synchronizing the operation of said converting means with said power supplying means.

5. The control system as defined in claim 3 wherein said controlling means is selectively actuatable for a variable period of time permitting the speed and direction of rotation of said servo device to be controlled.

6. The control system as defined in claim 1 further including means for adjusting the time period required by said receiving means and said retarding means to complete their respective downward count.

7. The control system as defined in claim 6 further including means for adjusting the time period required by said converting means to convert said analog input signal into a digital signal.

8. The control system as defined in claim 1 further including means to insure that said output signal is of sufficient duration so that said controlling means is selectively actuated for a minimum period of time so as to overcome the inertia of said servo device.

* * * * *